(12) United States Patent
Lim

(10) Patent No.: US 7,719,175 B2
(45) Date of Patent: May 18, 2010

(54) EXTERNAL ELECTRODE FLUORESCENT LAMP AND DISPLAY DEVICE INCLUDING THE SAME

(75) Inventor: Dae-San Lim, Annyang-si (KR)

(73) Assignee: LG. Display Co., Ltd., Seoul (KR)

( * ) Notice: Subject to any disclaimer, the term of this patent is extended or adjusted under 35 U.S.C. 154(b) by 989 days.

(21) Appl. No.: 11/320,356

(22) Filed: Dec. 28, 2005

(65) Prior Publication Data

US 2006/0273707 A1    Dec. 7, 2006

(30) Foreign Application Priority Data

Jun. 3, 2005   (KR) ...................... 10-2005-0047829

(51) Int. Cl.
*H01J 11/00* (2006.01)
*G02F 1/1335* (2006.01)

(52) U.S. Cl. ......................... 313/234; 313/607; 349/70; 349/71

(58) Field of Classification Search ................. 313/234, 313/607; 349/70, 71
See application file for complete search history.

(56) References Cited

U.S. PATENT DOCUMENTS 5,072,157 A * 12/1991 Greb et al. .................. 315/248
2004/0100438 A1 * 5/2004 Lee et al. ..................... 345/102
2004/0222743 A1 * 11/2004 Takagi et al. ................. 313/634
2005/0035700 A1 * 2/2005 Yano et al. ................... 313/234
2005/0140295 A1 * 6/2005 Van Den Nieuwenhuizen ........... 313/567
2006/0055326 A1 * 3/2006 Takeda et al. ............... 313/607

FOREIGN PATENT DOCUMENTS

CN    1515940 A    7/2004
CN    1531382 A    9/2004

OTHER PUBLICATIONS

Office Action dated Nov. 14, 2008 for Chinese Patent Application No. 2005101328705.

* cited by examiner

*Primary Examiner*—Bumsuk Won
(74) *Attorney, Agent, or Firm*—Brinks Hofer Gilson & Lione

(57) ABSTRACT

A liquid crystal display contains one or more external electrode fluorescent lamps (EEFL). Each EEFL has a tube filled with a discharge gas. Opposing first and second electrodes are disposed on an outer surface of the tube. Each of the first and second electrodes includes a cap electrode at one end of the tube and a first line electrode along a length direction of the tube; and a second electrode on the outer surface, the second electrode including a second cap electrode at the other end of the tube and a second line electrode along the length direction of the tube.

37 Claims, 4 Drawing Sheets

EXTERNAL ELECTRODE FLUORESCENT LAMP AND DISPLAY DEVICE INCLUDING THE SAME

The present invention claims the benefit of Korean Patent Application No. 2005-0047829, filed in Korea on Jun. 3, 2005, which is hereby incorporated by reference.

TECHNICAL FIELD

The present invention relates to a fluorescent lamp, and more particularly, to an external electrode fluorescent lamp (EEFL) and a display device including the same.

DISCUSSION OF THE RELATED ART

Until recently, display devices have generally used a cathode-ray tube (CRT). Presently, much effort is being expended to study and develop various types of flat panel displays (FPDs), such as liquid crystal display (LCD) devices, plasma display panels (PDP), field emission displays (FED), and electro-luminescence displays (ELD), as a substitute for CRTs. These FPDs are categorized into luminous types such as the PDP, FED and ELD that do not use a backlight unit, and non-luminous types such as the LCD that use a backlight unit.

The backlight unit of the non-luminous type FPD uses various types of lamps, such as a cold cathode fluorescent lamp (CCFL), an external electrode fluorescent lamp (EEFL) and a non-electrode type fluorescent lamp. The CCFL has electrodes inside both end portions of the CCFL, the EEFL has electrodes outside both end portions of the EEFL, and the non-electrode type fluorescent lamp does not have electrodes. Of these lamps, the EEFL has advantages, such as long lifetime, high brightness, high efficiency and low weight. The types of EEFLs include a belt-type EEFL, a cap-type EEFL, and a swell-type EEFL.

FIG. 1 is a schematic plan view illustrating an EEFL according to the related art.

As shown in FIG. 1, an EEFL 23 includes first and second cap electrodes 33a and 33b. The first and second cap electrodes 33a and 33b are disposed at both ends of an outer surface of a glass tube 35. The glass tube 35 is filled with a discharge gas including an inert gas and mercury (Hg). On an inner surface of the glass tube 35, a fluorescent material layer is formed to emit light. A backlight unit using the EEFL may be an edge-type backlight unit or a direct-type backlight unit.

The EEFL of the edge-type backlight unit is disposed at edge portions of a liquid crystal panel as a non-luminous type display panel. The EEFLs of the direct-type backlight unit are disposed in parallel directly below the liquid crystal panel. The edge-type backlight unit is fabricated easily, while the direct-type backlight unit is applicable to a large sized liquid crystal panel.

FIG. 2 is a schematic perspective view illustrating a liquid crystal module including a direct-type backlight unit having the EEFLs of FIG. 1.

As shown in FIG. 2, a liquid crystal module includes a liquid crystal panel 13, a backlight unit 20, a support main 17, a bottom cover 27 and a top cover 11.

The backlight unit 20 includes a plurality of EEFLs 23 arranged in parallel below the liquid crystal panel 13, a reflector 21 and a plurality of optical sheets 19 including prism and diffusion sheets. The plurality of EEFLs 23 is fixed by a pair of lamp guides 25 combined with the bottom cover 27. The support main 17 surrounds peripheral portions of the backlight unit 20 and is combined with the bottom cover 27. The liquid crystal panel 13 is laid on the backlight unit 20. The top cover 11 is combined with the bottom cover 27 such that the backlight unit 20 and the liquid crystal panel 13 are fixed.

As explained above, the EEFLs 23 are arranged in parallel above the bottom cover 27. Accordingly, the cap electrodes of the EEFLs 23 and the bottom cover 27 facing each other form a parasitic capacitor. In other words, since the cap electrode of EEFLs 23 and the bottom cover 27 face each other closely, the cap electrode and the bottom cover 27 function as two electrodes of the parasitic capacitor when a voltage is applied to the cap electrode. An amount of charges induced in the parasitic capacitor is expressed, q=CV, C=$\epsilon$ (A/d) (C is a parasitic capacitance, V is a voltage to the parasitic capacitor, $\epsilon$ is the permittivity, A is an area of the parasitic capacitor, and d is a distance between two electrodes of the parasitic capacitor).

Based on the above expression, since the voltage (V) applied to the cap electrode is high and the distance (d) between the cap electrode and the bottom cover is very close, the parasitic capacitance (C) and the induced charges are very large. Accordingly, a leakage current through the parasitic capacitor is very high. In addition, as the size of the LCD device increases, a length of EEFL increases and thus a path of an electric field induced by the two cap electrodes also increases. Therefore, light-irradiation efficiency of the EEFL is reduced.

SUMMARY OF THE INVENTION

By way of introduction only, in one aspect, an external electrode fluorescent lamp includes a tube filled with a discharge gas and first and second electrodes on an outer surface of the tube. The first electrode includes a first cap electrode at one end of the tube and a first line electrode along a length direction of the tube. The second electrode includes a second cap electrode at an opposing end of the tube and a second line electrode along the length direction of the tube.

In another aspect, a display device includes a display panel, a backlight unit, and a bottom cover. The backlight unit includes a lamp to supply light to the display panel. The lamp includes a tube filled with a discharge gas and first and second electrodes on an outer surface of the tube. The first electrode includes a first cap electrode at one end of the tube and a first line electrode along a length direction of the tube. The second electrode includes a second cap electrode at an opposing end of the tube and a second line electrode along the length direction of the tube.

In another aspect, a method of fabricating a liquid crystal display device includes positioning a liquid crystal display panel between a top cover and a bottom cover and arranging a backlight unit including a lamp such that radiation from the lamp impinges on the display panel. The backlight unit includes a lamp to supply light to the display panel. The lamp includes a tube filled with a discharge gas and first and second electrodes on an outer surface of the tube. The first electrode includes a first cap electrode at one end of the tube and a first line electrode along a length direction of the tube. The second electrode includes a second cap electrode at an opposing end of the tube and a second line electrode along the length direction of the tube.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the illustrated embodiments of the present invention, which are illustrated in the accompanying drawings.

Figure 3A:
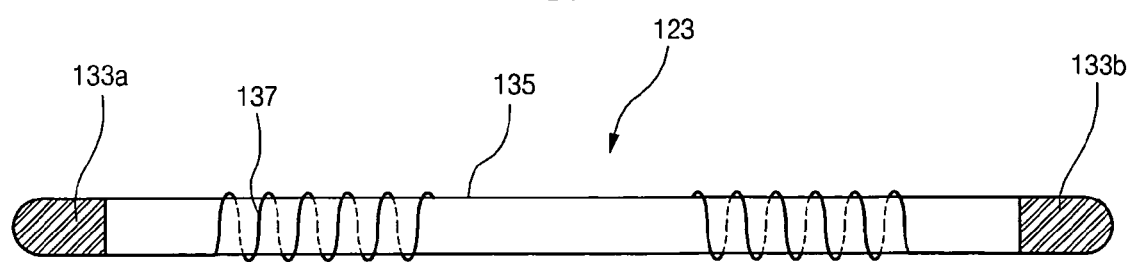
FIGS. 3A and 3B are plan views, which are top and front views, illustrating an EEFL according to an exemplary embodiment of the present invention.
Figure 3B:
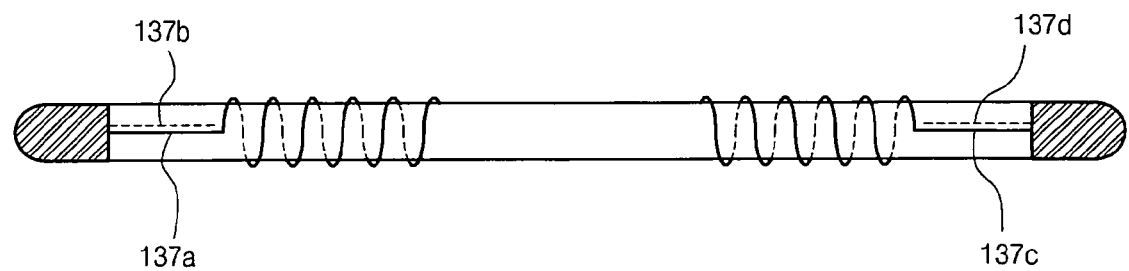

FIGS. 3A and 3B are plan views, which are top and front views, illustrating an EEFL according to an exemplary embodiment of the present invention. In other words, FIG. 3A shows the EEFL depicted from a liquid crystal panel side, and FIG. 3B shows the EEFL depicted from a side of a liquid crystal module.

As shown in FIG. 3A, an EEFL 123 of an exemplary embodiment includes a glass tube 135 and first and second electrodes on an outer surface of the glass tube 135. Although not shown in the drawings, the EEFL 123 further includes a fluorescent material layer on an inner surface of the glass tube 135 to emit light and a discharge gas including an inert gas and mercury (Hg).

The first and second electrodes are applied alternately with high and low voltages. In other words, when the first electrode is applied with one of the high and low voltages, the second electrode is applied with the other of the high and low voltages, and the high and low voltages are alternately applied to the first and second electrodes. Accordingly, the first and second electrodes alternately function as anode and cathode.

The first electrode includes a first cap electrode 133a, and first and second line electrodes 137a and 137b. The first cap electrode 133a is disposed at one end of the glass tube 135 and has a cap shape. The first and second line electrodes 137a and 137b are disposed on opposing outer surfaces of the glass tube 135. Each of the first and second line electrodes 137a and 137b has a line shape extending from the first cap electrode 133a and connected to the first cap electrode 133a. In particular, the first line electrode 137a has a straight portion and a solenoid portion, and the second line electrode 137b only has a straight portion. Accordingly, the length of the first line electrode 137a is more than the second line electrode 137b. The solenoid portion of the first line electrode 137a is wound around the outer surface of the glass tube 135 and extends toward a center portion of the glass tube 135.

The second electrode includes a second cap electrode 133b, and third and fourth line electrodes 137c and 137d, similar to the first electrode. The second cap electrode 133b is disposed at the other end of the glass tube 135 and has a cap shape. The third and fourth line electrodes 137c and 137d are disposed on opposing outer surfaces of the glass tube 135. Each of the third and fourth line electrodes 137c and 137d has a line shape extending from the second cap electrode 133b and connected to the second cap electrode 133b. In particular, the third line electrode 137c has a straight portion and a solenoid portion, and the fourth line electrode 137d only has a straight portion, similar to the first and second line electrodes 137a and 137b. Accordingly, the length of the third line electrode 137c is greater than the fourth line electrode 137d. The solenoid portion of the third line electrode 137c is wound around the outer surface of the glass tube 135 and extends toward the center portion of the glass tube 135.

As explained above, the first and second electrodes are arranged symmetrically. In other words, the first and second cap electrodes 133a and 133b are arranged at opposite ends of the glass tube 135, and the first and second line electrodes 137a and 137b are arranged facing and have structures similar to the third and fourth line electrodes 137c and 137d, respectively.

The first and second cap electrodes 133a and 133b, and the first to fourth line electrodes 137a to 137d may include aluminum (Al), silver (Ag) and/or copper (Cu). The first to fourth line electrodes 137a to 137d have a low resistance.

Since the first and second electrodes include the first to fourth line electrodes 137a to 137d and each of the first and third line electrodes 137a and 137c has a solenoid portion, a parasitic capacitance can be reduced and light-irradiation efficiency can increase in comparison with the related art.

Figure 1:
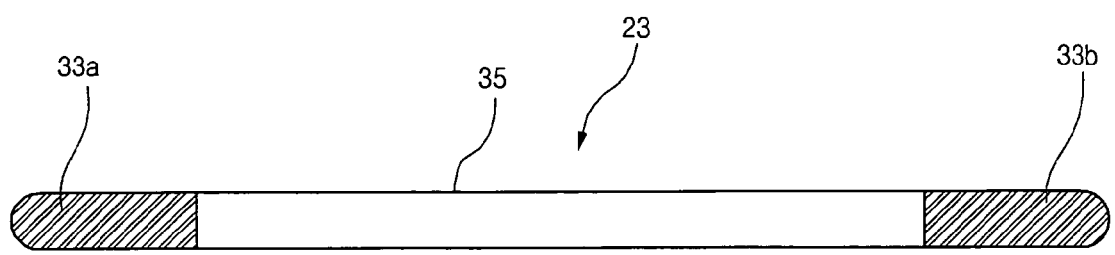
FIG. 1 is a schematic plan view illustrating an EEFL according to the related art.
Figure 2:
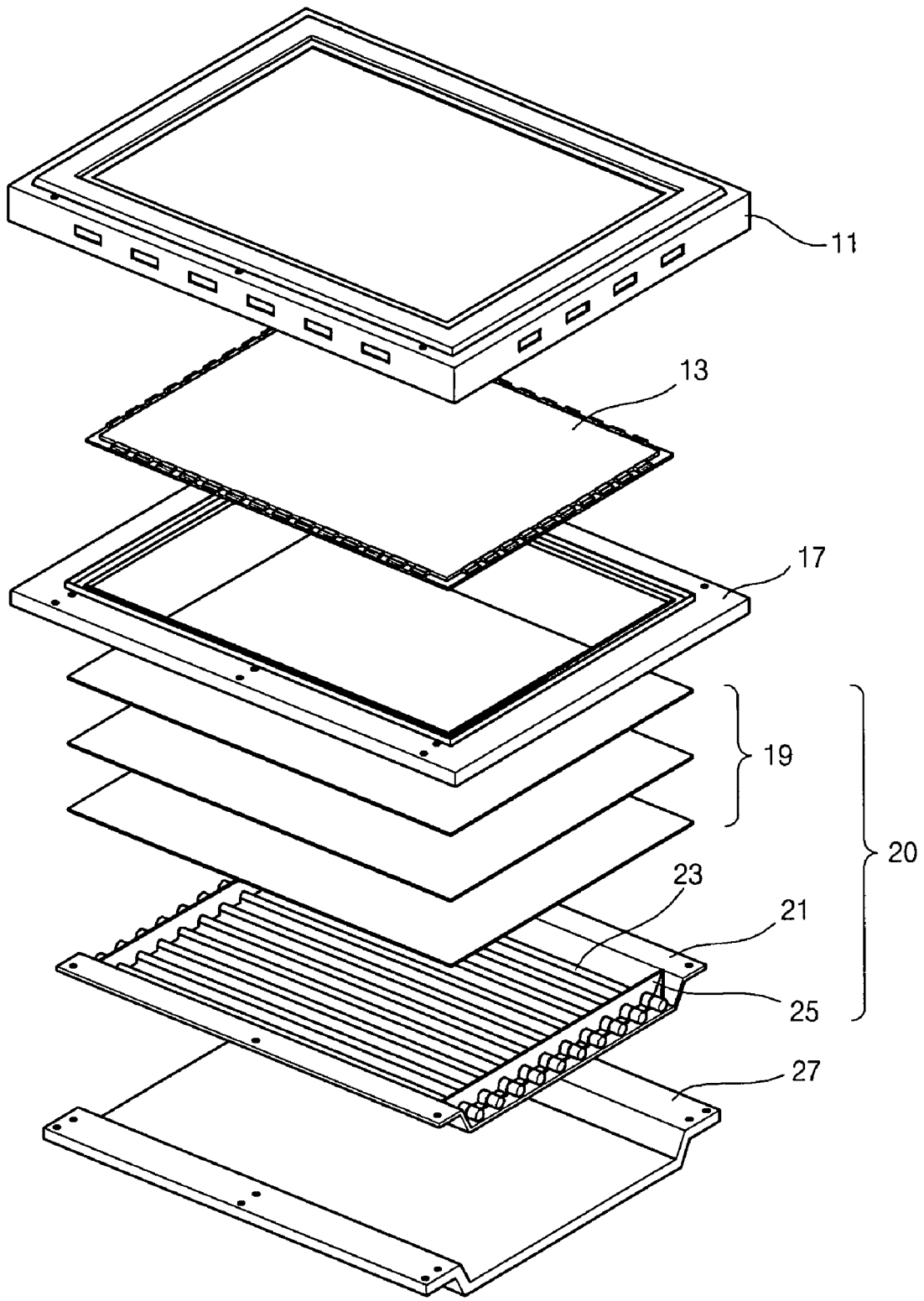
FIG. 2 is a schematic perspective view illustrating a liquid crystal module including the edge type backlight unit having the EEFLs of FIG. 1.

In other words, the areas of the cap electrodes 133a and 133b are reduced in comparison with the related art. The first to fourth line electrodes 137a to 137d are formed such that the reduced areas of the cap electrodes 133a and 133b are compensated with areas of the first to fourth line electrodes 137a to 137d. Accordingly, the parasitic capacitor between the cap electrodes 133a and 133b and the bottom cover (27 of FIG. 2) can be reduced. Although the areas of the cap electrodes 133a and 133b are reduced, since the line electrodes 137a to 137d compensate the reduced areas of the cap electrodes 133a and 133b, electrons generated at anode and cathode of both end portions are not reduced.

In addition, since the line electrodes 137a to 137d are formed along a length direction of the glass tube 125, electrons are excited and generated more broadly in the glass tube 123. In particular, the solenoid portion of the first and third line electrodes 137a and 137c induce a magnetic field conforming to Ampere's law. Also, an electric field, which is curled in the glass tube 135 and progresses toward the center portion of the glass tube 135 from one of the right and left end portions, is induced. In other words, since the first and second electrodes alternately function as an anode and cathode, the magnetic field is induced alternately leftward and rightward. In addition, the induced electric field circularly rotates and alternately progresses toward the center portion from the left side and the right side. Accordingly, electrons are excited and generated along the curled electric field toward the center portion of the glass tube 125. Therefore, discharging of the discharging gas filled in the glass tube 125 is generated effectively and broadly. Therefore, light-irradiation efficiency of the EEFL can increase.

As a result, as the line electrodes 137a to 137d are used for the EEFL, the parasitic capacitance can be reduced and the light-irradiation efficiency can increase.

The first and third line electrodes 137a and 137c have lengths such that the first and third line electrodes 137a and 137c excite electrons without generating an electrical short between the two electrodes 137a and 137c. The widths of the first and third line electrodes 137a and 137c are such that the first and third line electrodes 137a and 137c do not reduce the brightness of the EEFL. Accordingly, the first and third line electrodes 137a and 137c can have areas within the above-explained ranges to compensate for the reduced areas of the cap electrodes 133a and 133b. In addition, the straight portions of the first and third line electrodes 137a and 137c and of the second and fourth electrodes 137b and 137d are arranged at sides corresponding to sides of the liquid crystal module, rather than at top portions facing the liquid crystal panel. Accordingly, the line electrodes 137a to 137d do not reduce the brightness.

As explained above, the first and third line electrodes 137a and 137c having the straight and solenoid portions are used to reduce a parasitic capacitance and increase light-irradiation efficiency, and further, to do this, the second and fourth line electrodes 137b and 137d having the straight portion are used.

The cap electrodes 133a and 133b and the line electrodes 137a to 137d may be formed by various methods. For example, a method of forming the cap electrodes 133a and 133b may include placing metal caps on both ends of the glass tube 125, attaching metal tape on both ends of the glass tube 125, and/or dipping both ends of the glass tube 125 into a metal solution. A method of forming the line electrodes 137a to 137d may include a spray method in which a shield tape is attached on an outer surface of the glass tube 125 and a metal solution is sprayed through the shield tape, a roller method using a conductive bonding agent, and/or a dispense method using a nozzle.

Table 1 shows resistances of a line electrode formed by a spray method, a roller method and a dispense method. In Table 1, the dispense method is categorized into a first dispense method using a nozzle having a diameter of 0.5 mm (millimeters) and a second dispense method using a nozzle having a diameter of 0.3 mm (millimeters). The line electrode is made of silver paste having viscosity of about 9000±500 cPs, hardness of more than about 3 H, and volume resistivity of equal to or less than $1\times10$ Ωcm.

| Hardening condition | Spray method | Roller method | First dispense method 0.5 mm | Second dispense method 0.3 mm |
|---|---|---|---|---|
| 200° C. 10 min (minutes) | 0.36~0.38 Ω | 0.91~0.95 Ω | 0.55~0.60 Ω | 0.70~0.75 Ω |
| 200° C. 20 min (minutes) | 0.36~0.38 Ω | 0.91~0.95 Ω | 0.55~0.61 Ω | 0.75~0.77 Ω |

As shown in Table 1, among the various methods of forming the line electrode, the spray method is easy and forms a line electrode having the lowest resistance. The dispense method forms a line electrode having a resistance higher than the spray method, but forms a line electrode having the thinnest width, i.e., a width equal to or less than 1 mm (millimeters).

The line electrode is formed in the various methods such that the parasitic capacitance can be reduced and the light-irradiation efficiency can increase.

Figure 4A:
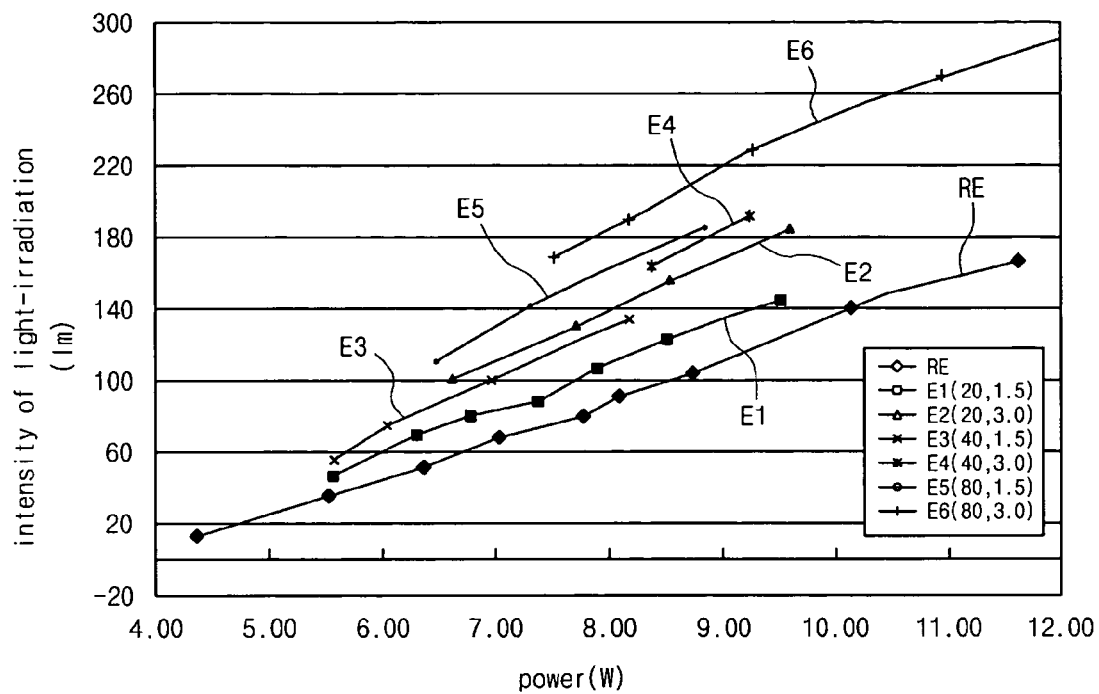
FIG. 4A is a graph illustrating relations of intensities of light-irradiation and powers of various EEFLs.
Figure 4B:
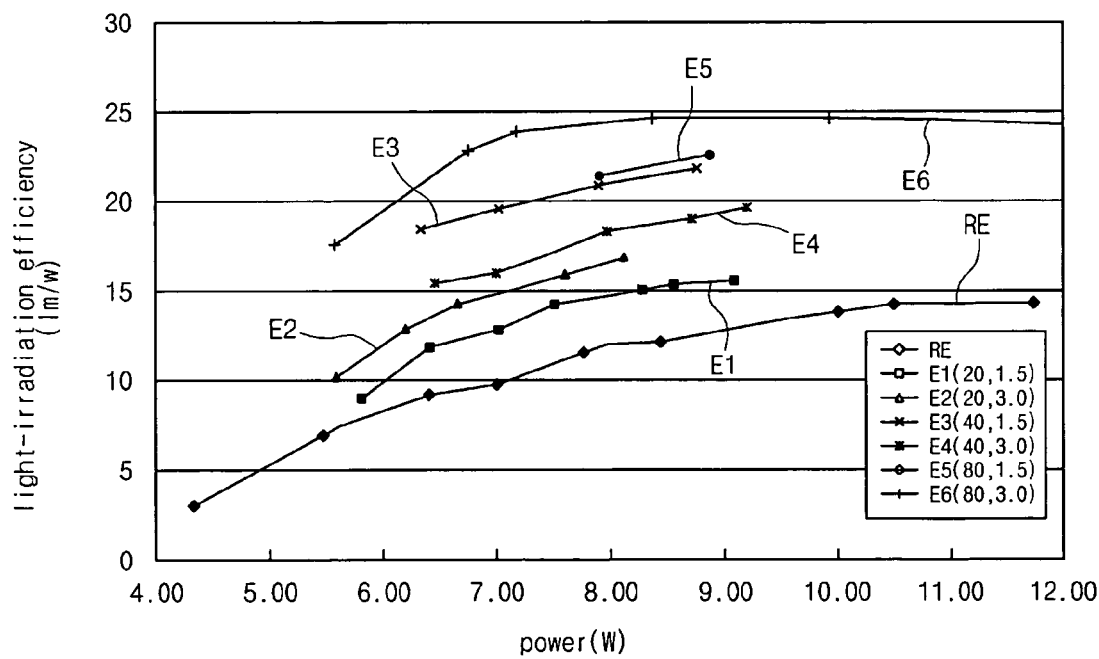
FIG. 4B is a graph illustrating of light-irradiation efficiencies and powers in various EEFLs.

FIG. 4A is a graph illustrating relations of intensities of light-irradiation and powers of various EEFLs, and FIG. 4B is a graph illustrating of light-irradiation efficiencies and powers in various EEFLs. In FIGS. 4A and 4B, a lumen (lm) is intensity of light-irradiation, a watt (W) is power, and lumen/watt (lm/W) is light-irradiation efficiency. Also, in FIGS. 4A and 4B, "RE" represents the related art external electrode, and "E1" to "E6" represent first to sixth example electrodes having a line electrode of the exemplary embodiment. Lengths and widths of line electrodes of first to sixth example electrodes "E1" to "E6" of an exemplary embodiment are expressed as (a mm, b mm). In other words, a first example electrode having a line electrode of a length of 20 mm and a width of 1.5 mm is expressed as "E1 (20, 1.5)".

As shown in FIGS. 4A and 4B, the intensity of light-irradiation and the light-irradiation efficiency of the related art electrode "RE" are proportional to the power applied to the line electrode. Accordingly, as the power increases the intensity of light-irradiation and the light-irradiation efficiency increase. In addition, as the length and the width of the line electrode increase, the intensity of light-irradiation and the light-irradiation efficiency increase. As a result, to get high intensity light-irradiation and high light-irradiation efficiency, the EEFL uses a line electrode having a longer length and a wider width.

It will be apparent to those skilled in the art that various modifications and variations can be made in the external electrode fluorescent lamp and the display device including the external fluorescent lamp without departing from the spirit or scope of the invention. Thus, it is intended that the present invention cover the modifications and variations of this invention provided they come within the scope of the appended claims and their equivalents.

What is claimed is:

1. An external electrode fluorescent lamp comprising:
   a tube filled with a discharge gas;
   a first electrode on an outer surface of the tube, the first electrode including a first cap electrode at one end of the tube and a first line electrode along a length direction of the tube, the first line electrode contacting the outer surface of the tube; and
   a second electrode on the outer surface of the tube, the second electrode including a second cap electrode at an opposing end of the tube and a second line electrode along the length direction of the tube, the second line electrode contacting the outer surface of the tube,
   wherein the first electrode further includes a third line electrode having a straight portion and the second electrode further includes a fourth line electrode having a straight portion.

2. The lamp according to claim 1, wherein each of the first and second line electrodes has a straight portion and a solenoid portion.

3. The lamp according to claim 1, wherein the first line electrode is longer than the third line electrode and the second line electrode is longer than the fourth line electrode.

4. The lamp according to claim 1, wherein the first to fourth line electrodes include at least one of aluminum (Al), silver (Ag), or copper (Cu).

5. The lamp according to claim 1, wherein the first and second electrodes are arranged symmetrically around a center of the tube.

6. The lamp according to claim 1, wherein ends of the first and second line electrodes are disposed far enough apart in the length direction of the tube such that the first and second electrodes are not shorted together when an operation voltage is applied to the first and second electrodes.

7. An external electrode fluorescent lamp comprising:
   a tube filled with a discharge gas;
   a first electrode on an outer surface of the tube, the first electrode including a first cap electrode at one end of the tube and a first line electrode along a length direction of the tube, the first line electrode contacting the outer surface of the tube; and
   a second electrode on the outer surface of the tube, the second electrode including a second cap electrode at an opposing end of the tube and a second line electrode along the length direction of the tube, the second line electrode contacting the outer surface of the tube,
   wherein each of the first and second line electrodes has a straight portion and a solenoid portion, and
   wherein the straight portion of the first line electrode is disposed between the solenoid portion of the first line electrode and the first cap electrode, the straight portion of the second line electrode is disposed between the solenoid portion of the second line electrode and the second cap electrode.

8. The lamp according to claim 7, wherein the first electrode further includes a third line electrode having a straight portion, the second electrode further includes a fourth line electrode having a straight portion, the straight portions of the first line electrode and the third line electrode extend from the first cap electrode on opposite sides of the tube, and the straight portions of the second line electrode and the fourth line electrode extend from the second cap electrode on opposite sides of the tube.

9. The lamp according to claim 7, wherein coils of the solenoid portion of each of the first and second line electrodes are regularly spaced.

10. A display device comprising:
a display panel;
a backlight unit including a lamp to supply light to the display panel, the lamp including:
a tube filled with a discharge gas;
a first electrode on an outer surface of the tube, the first electrode including a first cap electrode at one end of the tube and a first line electrode along a length direction of the tube, the first line electrode contacting the outer surface of the tube; and
a second electrode on the outer surface of the tube, the second electrode including a second cap electrode at an opposing end of the tube and a second line electrode along the length direction of the tube, the second line electrode contacting the outer surface of the tube; and
a bottom cover facing the tube,
wherein the first electrode further includes a third line electrode having a straight portion and the second electrode further includes a fourth line electrode having a straight portion.

11. The display device according to claim 10, wherein each of the first and second line electrodes has a straight portion and a solenoid portion.

12. The display device according to claim 10, wherein the first line electrode is longer than the third line electrode and the second line electrode is longer than the fourth line electrode.

13. The display device according to claim 10, wherein the first to fourth line electrodes include at least one of aluminum (Al), silver (Ag), or copper (Cu).

14. The display device according to claim 10, wherein a plurality of the lamps is arranged in parallel between the display panel and the bottom cover.

15. The display device according to claim 10, wherein the display panel includes a liquid crystal panel.

16. The display device according to claim 10, wherein the first and second electrodes are arranged symmetrically around a center of the tube.

17. The display device according to claim 10, wherein ends of the first and second line electrodes are disposed far enough apart in the length direction of the tube such that the first and second electrodes are not shorted together when an operation voltage is applied to the first and second electrodes.

18. A display device comprising:
a display panel;
a backlight unit including a lamp to supply light to the display panel, the lamp including:
a tube filled with a discharge gas;
a first electrode on an outer surface of the tube, the first electrode including a first cap electrode at one end of the tube and a first line electrode along a length direction of the tube, the first line electrode contacting the outer surface of the tube; and
a second electrode on the outer surface of the tube, the second electrode including a second cap electrode at an opposing end of the tube and a second line electrode along the length direction of the tube, the second line electrode contacting the outer surface of the tube; and
a bottom cover facing the tube,
wherein each of the first and second line electrodes has a straight portion and a solenoid portion, and
wherein the straight portion of the first line electrode is disposed between the solenoid portion of the first line electrode and the first cap electrode, the straight portion of the second line electrode is disposed between the solenoid portion of the second line electrode and the second cap electrode.

19. The display device according to claim 18, wherein the first electrode further includes a third line electrode having a straight portion, the second electrode further includes a fourth line electrode having a straight portion, the straight portions of the first line electrode and the third line electrode extend from the first cap electrode on opposite sides of the tube, and the straight portions of the second line electrode and the fourth line electrode extend from the second cap electrode on opposite sides of the tube.

20. The display device according to claim 18, wherein coils of the solenoid portion of each of the first and second line electrodes are regularly spaced.

21. A display device comprising:
a display panel;
a backlight unit including a lamp to supply light to the display panel, the lamp including:
a tube filled with a discharge gas;
a first electrode on an outer surface of the tube, the first electrode including a first cap electrode at one end of the tube and a first line electrode along a length direction of the tube, the first line electrode contacting the outer surface of the tube; and
a second electrode on the outer surface of the tube, the second electrode including a second cap electrode at an opposing end of the tube and a second line electrode along the length direction of the tube, the second line electrode contacting the outer surface of the tube; and
a bottom cover facing the tube,
wherein each of the first and second line electrodes has a straight portion and a solenoid portion, and
wherein the straight portions of the first and second line electrodes are arranged at portions of the tube other than top portions most proximate to the display panel and bottom portions most proximate to the bottom cover.

22. The display device according to claim 21, wherein the straight portions of the first and second line electrodes are arranged at a side of the tube most proximate to a side of the display device.

23. A method of fabricating a liquid crystal display device, the method comprising:
positioning a liquid crystal display panel between a top cover and a bottom cover; and
arranging a backlight unit including a lamp such that radiation from the lamp impinges on the display panel, the lamp containing:
a tube filled with a discharge gas;
a first electrode on an outer surface of the tube, the first electrode including a first cap electrode at one end of the tube and a first line electrode along a length direction of the tube, the first line electrode contacting the outer surface of the tube; and
a second electrode on the outer surface of the tube, the second electrode including a second cap electrode at an opposing end of the tube and a second line electrode along the length direction of the tube, the second line electrode contacting the outer surface of the tube, wherein the first electrode further includes a third line electrode having a straight portion and the second electrode further includes a fourth line electrode having a straight portion.

24. The method according to claim 23, wherein each of the first and second line electrodes has a straight portion and a solenoid portion.

25. The method according to claim 24, wherein the straight portions of the first line electrode and the third line electrode extend from the first cap electrode on opposite sides of the tube, and the straight portions of the second line electrode and the fourth line electrode extend from the second cap electrode on opposite sides of the tube.

26. The method according to claim 25, further comprising arranging the first and second electrodes such that the straight portions of the first and second line electrodes are arranged at portions of the tube other than top portions most proximate to the display panel and bottom portions most proximate to the bottom cover.

27. The method according to claim 26, further comprising arranging the first and second electrodes such that all of the straight portions are arranged at sides of the tube most proximate to sides of the liquid crystal display device.

28. The method according to claim 23, further comprising arranging a plurality of the lamps in parallel between the display panel and the bottom cover.

29. The method according to claim 23, wherein ends of the first and second line electrodes are disposed far enough apart in the length direction of the tube such that the first and second electrodes are not shorted together when an operation voltage is applied to the first and second electrodes.

30. A method of fabricating a liquid crystal display device, the method comprising:
positioning a liquid crystal display panel between a top cover and a bottom cover;
arranging a backlight unit including a lamp such that radiation from the lamp impinges on the display panel, the lamp containing:
a tube filled with a discharge gas;
a first electrode on an outer surface of the tube, the first electrode including a first cap electrode at one end of the tube and a first line electrode along a length direction of the tube, the first line electrode contacting the outer surface of the tube; and
a second electrode on the outer surface of the tube, the second electrode including a second cap electrode at an opposing end of the tube and a second line electrode along the length direction of the tube, the second line electrode contacting the outer surface of the tube;
forming the cap electrodes by at least one of: placing conductive caps on the ends of the tube, attaching a conductive tape on the ends of the tube, or dipping the ends of the tube into a conductive solution; and
forming the first and second line electrodes by at least one of: a spray method in which a shield tape is attached on the outer surface of the tube and a conductive solution is sprayed through the shield tape, a roller method using a conductive bonding agent, or a dispense method using a nozzle.

31. The method according to claim 30, wherein the first and second line electrodes is formed under a hardening condition of about 200° C. and about 10 to 20 mm.

32. An external electrode fluorescent lamp comprising:
a tube filled with a discharge gas;
a first electrode on an outer surface of the tube, the first electrode including a first cap electrode at one end of the tube and a first line electrode along a length direction of the tube, the first line electrode contacting the outer surface of the tube; and
a second electrode on the outer surface of the tube, the second electrode including a second cap electrode at an opposing end of the tube and a second line electrode along the length direction of the tube, the second line electrode contacting the outer surface of the tube,
wherein each of the first and second line electrodes includes silver paste having viscosity of about 9000±500 cPs, hardness of more than about 3H, and volume resistivity of equal to or less than $1\times10$ Ωcm.

33. The lamp according to claim 32, wherein each of the first and second line electrodes has a length of about 20 to 80 mm and a width of about 1.5 to 3.0 mm.

34. A display device comprising:
a display panel;
a backlight unit including a lamp to supply light to the display panel, the lamp including:
a tube filled with a discharge gas;
a first electrode on an outer surface of the tube, the first electrode including a first cap electrode at one end of the tube and a first line electrode along a length direction of the tube, the first line electrode contacting the outer surface of the tube; and
a second electrode on the outer surface of the tube, the second electrode including a second cap electrode at an opposing end of the tube and a second line electrode along the length direction of the tube, the second line electrode contacting the outer surface of the tube; and
a bottom cover facing the tube,
wherein each of the first and second line electrodes includes silver paste having viscosity of about 9000±500 cPs, hardness of more than about 3H, and volume resistivity of equal to or less than $1\times10$ Ωcm.

35. The display device according to claim 34, wherein each of the first and second line electrodes has a length of about 20 to 80 mm and a width of about 1.5 to 3.0 mm.

36. A method of fabricating a liquid crystal display device, the method comprising:
positioning a liquid crystal display panel between a top cover and a bottom cover; and
arranging a backlight unit including a lamp such that radiation from the lamp impinges on the display panel, the lamp containing:
a tube filled with a discharge gas;
a first electrode on an outer surface of the tube, the first electrode including a first cap electrode at one end of the tube and a first line electrode along a length direction of the tube, the first line electrode contacting the outer surface of the tube; and
a second electrode on the outer surface of the tube, the second electrode including a second cap electrode at an opposing end of the tube and a second line electrode along the length direction of the tube, the second line electrode contacting the outer surface of the tube,
wherein each of the first and second line electrodes includes silver paste having viscosity of about 9000±500 cPs, hardness of more than about 3H, and volume resistivity of equal to or less than $1\times10$ Ωcm.

37. The method according to claim 36, wherein each of the first and second line electrodes has a length of about 20 to 80 mm and a width of about 1.5 to 3.0 mm.

* * * * *